United States Patent [19]

Itoh et al.

[11] 4,061,844
[45] Dec. 6, 1977

[54] DYESTUFF ACCEPTOR FOR SYNTHETIC RESINS

[75] Inventors: Iko Itoh; Yasuhiko Inoue; Kenji Nagaoka, all of Niihama, Japan

[73] Assignee: Sumitomo Chemical Company, Limited, Japan

[21] Appl. No.: 575,043

[22] Filed: May 6, 1975

Related U.S. Application Data

[63] Continuation of Ser. No. 427,714, Dec. 26, 1973, abandoned.

[30] Foreign Application Priority Data

Dec. 28, 1972 Japan .................................. 47-1392

[51] Int. Cl.² .......................... C08K 5/56; C08K 5/57
[52] U.S. Cl. .............................. 526/4; 260/857 UN; 260/873; 260/897 B; 260/898; 260/899; 260/901; 526/1; 526/3; 526/5; 526/312
[58] Field of Search ........ 260/42.19, 86.1 N, 45.75 R, 260/45.75 K, 45.75 N, 80.73, 32.4, 901, 45.75 T, 45.75 J, 45.75 H; 526/312, 1, 3, 4, 5

[56] References Cited

U.S. PATENT DOCUMENTS

| 3,240,552 | 3/1966 | Joyner et al. ............................... 8/39 |
| 3,395,198 | 7/1968 | Taniguchi ............................ 526/312 |
| 3,580,878 | 6/1971 | Nakanome et al. .................. 260/29.6 |
| 3,928,269 | 12/1975 | Taylor .................................. 526/312 |

Primary Examiner—Paul R. Michl
Attorney, Agent, or Firm—Stevens, Davis, Miller & Mosher

[57] ABSTRACT

A dyestuff acceptor for synthetic resins such as polyvinyl chloride comprises as essential components (A) a copolymer of at least one ethylenically unsaturated monomer and an aminoalkyl acrylate compound represented by the general formula,

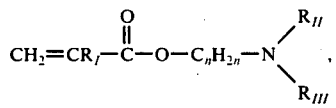

wherein $R_I$ represents hydrogen or methyl group, $R_{II}$ and $R_{III}$ represent hydrogen or alkyl groups having 1 to 4 carbon atoms, and n represents an integer from 1 to 4, and (B) a compound of a polyvalent metal selected from silicon, nickel, tin, cobalt, and iron, having at least one functional group selected from the group consisting of carboxyl group, thioalkoxy groups, alkyl groups, phenyl groups, and cyclopentadienyl group, the weight ratio of said component (A) to said component (B) being about 100 : 1 to 1 : 1.

17 Claims, No Drawings

DYESTUFF ACCEPTOR FOR SYNTHETIC RESINS

This is a continuation of application Ser. No. 427,714, filed Dec. 26, 1973, now abandoned.

This invention relates to a dyestuff acceptor suitable for dyeing a synthetic resin or a shaped article thereof. More particularly, this invention relates to a dyestuff acceptor for a synthetic resin, comprising as essential components a copolymer of an ethylenically unsaturated monomer and an aminoalkyl acrylate compound, and a polyvalent metal compound having a specified functional group.

Owing to a relatively poor chemical reactivity, synthetic resins such as, for example, polyvinyl chloride have a disadvantage in that they cannot be dyed by an ordinary dyeing method in a bright and deep shade with excellent color fastness, that is, fastness of color to daylight, washing, dry cleaning, etc.

Accordingly, a great number of proposals have, heretofore, been made on improvement of the method for dyeing polyvinyl chloride. Among such proposals, one of the methods worthy of attention comprises adding to polyvinyl chloride a substance which has an affinity to the dyestuff. Such additives, however, have generally poor compatibility with polyvinyl chloride so that it is difficult to obtain uniform dyeing.

Another dyeing method which has been proposed consists in that the dyeing property of polyvinyl chloride is improved from the side of polymer structure by copolymerization or graft copolymerization with a substance having a functional group such as carboxyl group or an acid anhydride group, and the copolymerized polyvinyl chloride is dyed either with an acid dye in the presence of a cationic surface active agent or with a water-soluble complex of an anionic dyestuff such as a direct dye or acid dye with a cationic compound such as trimethylamine or N,N-dimethylaniline. Such methods, however, have a disadvantage in that either the dyed article is in no more than a stained state or the dyed article has adsorbed the dyestuff only superficially and even if a deep color dyeing is obtained just after dyeing, the adsorbed dyestuff continues to fall off or its color continues to fade away on repeated washing or on long exposure to daylight, resulting in continued deterioration in color tone of the dyed article.

An object of this invention is to provide a dyestuff acceptor in which the aforesaid disadvantages have been improved and which is capable of enabling deep and bright dyeing of synthetic resins, particularly polyvinyl chloride, in the form of powder or shaped article such as sheet, film fiber, container, or the like, and, moreover, capable of imparting excellent color fastness to the dyed article.

As a result of extensive studies conducted in order to overcome the aforesaid disadvantages of the conventional methods and to improve the dyeing property of synthetic resins, the present inventors found that a mixture comprising a copolymer of an ethylenically unsaturated monomer with an aminoalkyl acrylate compound and a polyvalent metal compound having a specified functional group becomes an excellent dyestuff acceptor for synthetic resins which is capable of enabling deep and bright dyeing of synthetic resins in the form of powder or shaped article, and, moreover, capable of imparting excellent color fastness to the dyed article. Based on this finding, the present invention has been accomplished.

This invention provided a dyestuff acceptor for synthetic resins, comprising as essential components (A) a copolymer of at least one ethylenically unsaturated monomer and an aminoalkyl acrylate compound represented by the general formula,

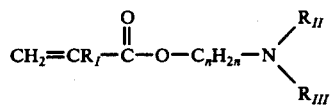

wherein $R_I$ represents hydrogen or methyl group, $R_{II}$ and $R_{III}$ represent hydrogen or alkyl groups having 1 to 4 carbon atoms, and $n$ represents an integer from 1 to 4, and (B) a compound of a polyvalent metal selected from silicon, nickel, tin, cobalt, and iron, having at least one functional group selected from the group consisting of carboxyl group, thioalkoxy groups, alkyl groups, phenyl groups, and cyclopentadienyl group, the weight ratio of said component (A) to said component (B) being about 100:1 to 1:1.

The essential feature of this invention is the use of a polyvalent metal compound having a specified functional group. The dyestuff acceptor for synthetic resins of this invention, in which such a polyvalent metal compound is used together with an aminoalkyl acrylate copolymer, manifests distinguished dyeing effect, imparting particularly superior fastness to bright and deep colors, compared with the case where an aminoalkyl acrylate copolymer is used alone. Moreover, the present dyestuff acceptor has an advantage of permitting also remarkably bright and deep dyeing of resin containing halogen atoms which has, heretofore, been considered difficult to dye.

Further, particularly bright and deep dyeing is obtained also when a synthetic resin in the form of powder or shaped article is dyed by use of the dyestuff acceptor as a solution in a solvent, and hence, such a solution is extremely effective as a top-coating agent.

In preparing the aforesaid copolymer which is one of the components constituting the present dyestuff acceptor for synthetic resins, the aminoalkyl acrylate compounds having the general formula,

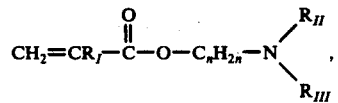

to be used are such that $R_I$ is hydrogen or methyl group; $R_{II}$ and $R_{III}$ are hydrogen or alkyl groups having 1 to 4 carbon atoms including hydrogen, and methyl, ethyl, n-propyl, isoproyl, n-butyl, isobutyl, and tert-butyl groups; and the $-C_nH_{2n}-$ grouping, in which $n$ is an integer from 1 to 4, is selected from methylene, ethylene, trimethylene, tetramethylene, dimethylmethylene, methylethylmethylene, dimethylethylene, and methyltrimethylene groups.

Examples of individual compounds represented by the aforesaid general formula and acrylic acid esters including aminomethyl acrylate, aminoethyl acrylate, amino-n-butyl acrylate, N-methylaminoethyl acrylate, N-ethylaminoethyl acrylate, N-ethylaminoisobutyl acrylate, N-tert-butylaminoethyl acrylate, N,N-dimethylaminoethyl acrylate, N,N-dimethylaminoisopropyl acrylate, N,N-dimethylamino-n-butyl acrylate, N-methyl-N-ethyl acrylate, N,N-diethylaminoethyl acrylate, N,N-diisopropylaminoethyl acrylate, N,N-di-n-propylamino-n-propyl acrylate, N,N-di-n-propylaminoethyl acrylate, and N,N-di-n-butylamino-n-propyl acrylate; and methacrylates corresponding to these acrylates.

In the aminoalkyl acrylate compounds having the aforesaid general formula, if $R_{II}$ and $R_{III}$ are alkyl groups having 5 or more carbon atoms or $n$ is 5 or larger, improvement in the dyeing property becomes insignificant.

In preparing the aforesaid copolymer which is one of the components constituting the present dyestuff acceptor for synthetic resins, the ethylenically unsaturated monomers include the compounds listed below.

Vinyl esters having 2 to 6 carbon atoms in the saturated carboxylic acid component, such as, for example, vinyl acetate, vinyl propionate, vinyl benzoate, etc.; acrylic and methacrylic esters having 1 to 18 carbon atoms in the saturated alcohol component, such as, for example, methyl, ethyl, propyl, isopropyl, butyl, isobutyl, 2-ethylhexyl, cyclohexyl, dodecyl, and octadecyl acrylates and methacrylates; maleic anhydride; mono- and di-esters of maleic acid having 1 to 18 carbon atoms in the saturated alcohol component, such as, for example, mono- and di-methyl, -ethyl, -butyl, -cyclohexyl, -2-ethylhexyl, -dodecyl, and -octadecyl maleate; vinyl ethers such as, for example, vinyl methyl ether, vinyl ethyl ether, etc.; N-vinyllactams, such as, for example, N-vinyl pyrrolidone and N-vinylcaprolactam; acrylamide compounds; sec-vinylcarboxamides; and N-vinyl-N-alkylcarboxamides.

Vinyl esters having 2 to 6 carbon atoms in saturated carboxylic acid moiety, acrylates, and methacrylates are especially suitable as the ethylenically unsaturated monomers.

The copolymer of an ethylenically unsaturated monomer and an aminoalkyl acrylate compound of the aforesaid general formula, said copolymer being one of the members constituting the present dyestuff acceptor for synthetic resins, preferably contains 1 to 80 mol-% of the aminoalkyl acrylate compound and has an intrinsic viscosity of 0.1 to 3 dl/g, as measured in acetone at 25° C., though not restricted by these values.

No particular restriction is placed on preparation of the above-noted copolymer. It can be prepared by adopting conventionally known methods such as, for example, precipitation polymerization in an aqueous medium, emulsion polymerization, suspension polymerization, solution polymerization, and mass polymerization by use of a free radical catalyst.

In the next place, another member, which constitutes the present dyestuff acceptor for synthetic resins, is a polyvalent metal compound containing at least one functional group selected from the group consisting of carboxyl group, alkoxy groups, thioalkoxy groups, alkyl groups, phenyl groups, and cyclopentadienyl group, said polyvalent metal being selected from silicon, nickel, tin, cobalt, and iron.

Examples of the polyvalent metal compounds are those of the general formula $MX_m$, wherein M is selected from the group consisting of iron, cobalt, nickel, tin, and silicon, X can be either the same or different groups selected from the group consisting of carboxyl group, thioalkoxy groups, alkyl groups, phenyl groups, and cyclopentadienyl group, and $m$ is the valence of metal M. Individual compounds included are, for example, laurates, stearates, naphthenates, oleates, and acetates of iron, cobalt, and nickel; compounds containing carboxyl group such as dibutyltin maleate and its polymer, dibutyltin dilaurate, dibutyltin distearate, dioctyltin maleate polymer, dioctyltin dilaurate, and dioctyltin distearate; compounds containing thioalkoxy group such as dibutyltin dibutylmercaptide, dibutyltin dimercaptoacetate, dibutyltin dioctylmercaptide, and dioctyltin dimercaptoacetate; compounds containing alkyl groups such as tetrabutyltin, tetraoctyltin, tetrabutylsilane, and tetraoctylsilane; compounds containing phenyl groups such as tetraphenyltin and tetraphenylsilane; and compounds containing cyclopentadienyl group such as ferrocene, nickelocene, and cobaltocene. Another examples are the compounds represented by the general formula $MX_pY_q$ (wherein M and X are as defined above, Y represents oxygen atom or sulfur atom, and $p + 2q$ represents the atomic valency of the metal) such as, for example, dibutyltin oxide, dioctyltin oxide, dibutyltin sulfide, dioctyltin sulfide, dimethylpolysiloxane, diphenypolysiloxane, and methylphenylpolysiloxane. Further examples are the compounds represented by the general formula $MX_rZ_s$ (wherein M and X are as defined above, Z represents a halogen atom and $r + s$ represents the atomic valency of the metal) such as dibutyltin dichloride, dioctyltin dichloride, tributyltin chloride, trioctyltin chloride, butyltin trichloride, octyltin trichloride, phenyltrichlorosilane, trimethylchlorosilane, dimethyldichlorosilane, and diphenyldichlorosilane.

Among the polyvalent metal compounds to be incorporated into the present dyestuff acceptor, tin compounds are especially preferred because of their remarkable effect on dyeing.

The weight ratio used of the copolymer of the aforesaid ethylenically unsaturated monomer with an aminoalkyl acrylate compound having the aforesaid general formula to the polyvalent metal compound containing a specified functional group is from about 100:1 to 1:1, preferably from 50:1 to 2:1. If the said weight ratio used of the copolymer to the polyvalent metal compound is greater than 100:1, an improvement effect on bright and deep dyeing is not recognizable, while if the weight ratio used of the said copolymer to the polyvalent metal compound is less than 1:1, uniformity of the dyeing is undesirably decreased.

The present dyestuff acceptor for synthetic resins can be used either as mixed by mechanical means with a powdered synthetic resin, or as a so-called top coating agent which is a solution in an organic solvent containing the present dyestuff acceptor and is coated on already finished shaped articles of the synthetic resin.

The amount of the present dyestuff acceptor to be incorporated into a powdered synthetic resin is about 0.1 to 50% by weight based on the resin powder, depending on the type of resin used. If the amount of said dyestuff acceptor added to the resin powder is below 0.1% by weight, the improvement in dyeing performance becomes insignificant, while if the amount exceeds 50% by weight, physical and mechanical properties of the shaped articles from the resin become deteriorated. In mixing the present dyestuff acceptor and the powdered synthetic resin, it is tolerable to add various other substances such as, for example, those useful for improving said synthetic resin, including, for example, plasticizers, stabilizers, lubricants, antistatic agents, and pigments.

Next, the amount of an organic solvent necessary to use the present dyestuff acceptor as a solution in said solvent is subject to no particular restriction, but generally the amount is 1.000 parts by weight or less for one part by weight of the present dyestuff acceptor. The list of solvents for use in this case includes aromatic hydrocarbon such as benzene, toluene, xylene, cymene, cumene, diethylbenzene, ethylbenzene, and durene; ketones such as methyl ethyl ketone, methyl isobutyl ketone, acetone, and cyclohexanone; ethers such as tetrahydrofuran, dioxane, and diethyl ether; and nitro compounds such as nitrobenzene and nitrotoluene. Further, mixtures of various solvents can also be used.

To such a solvent, can be added various other substances such as, for example, plasticizers, stabilizers, lubricants, antistatic agents, and pigments. The organic solution thus obtained containing the present dyestuff acceptor is used by coating said solution on a powder or shaped articles of a synthetic resin, and dyeing of said shaped articles or powder is effected by removing the solvent and then contacting with a dyestuff. In using the organic solution of the present dyestuff acceptor, it is preferable, in view of improving adhesion to a film, that the resin to be dyed is dissolved in said solution in any optional amount, but generally in amount of 100 parts by weight for 1 part by weight of the present dyestuff acceptor used.

When the present dyestuff acceptor is to be used as a solution in an organic solvent, the polyvalent metal compound to be combined should be soluble in said solvent.

The present dyestuff acceptor for synthetic resins can be dyed in excellently bright and deep shade with acid dyes, metalliferous dyes, chrome dyes, and other anionic dyes. Such dyestuffs include acid dyes such as, for example, Xylene Light Yellow 2GP (C.I. (abbreviation of Color Index; the same applies hereinafter) Acid Yellow 29), Xylene Fast Yellow P (C.I. Acid Yellow 61), Azo Rubinol 3GS (C.I. Acid Red 37), Xylene Fast Red P (C.I. Acid Red 118), Alizarin Light Blue 4GL (C.I. Acid Blue 23), Xylene Fast Blue P (C.I. Acid Blue 82), Xylene Fast Blue PR (C.I. Acid Blue 129), Xylene Fast Violet P3R (C.I. Acid Violet 47), Alizarin Light Green GS (C.I. Acid Green 25), Hat Fast Black FS (Acid Black), Xylene Brilliant Black BN (Acid Black) (all of the foregoing are trademards by Sandoz Co.), Carbolan Yellow 3GS (C.I. Acid Yellow 72), Carbolan Crimson 3B (C.I. Acid Red 139), Carbolan Green G (C.I. Acid Green 27) (the foregoing are trademarks by I.C.I. Ltd.), Suminol Levelling Sky Blue R, Suminol Fast Red BB, Lanyl Brown 3R (the foregoing are trademarks by Sumitomo Chemical Co.); metalliferous dyes such as Neolan Yellow BE (C.I. Acid Yellow 54), Neolan Orange GRE (C.I. Acid Orange 62), Neolan Red GRE (C.I. Acid Red 183), Neolan Pink BE (Acid Red 195), Neolan Blue 2G (C.I. Acid Blue 158), Neolan Violet 3R (C.I. Acid Violet 56), Neolan Green BL (C.I. Acid Green 12), Neolan Brown 2G, Neolan Black WA (C.I. Acid Black 52), Cibalan Yellow GRL (C.I. Acid Yellow 116), Cibalan Orange RL (C.I. Acid Orange 88), Cibalan Red 2GL (C.I. Acid Red 211), Cibalan Scarlet GL (C.I. Acid Red 209), Cibalan Blue BL (C.I. Acid Blue 168), Cibalan Brown BL (C.I. Acid Brown 19), Cibalan Green GL (C.I. Acid Green 43), Cibalan Grey BL (C.I. Acid Black 60) (the foregoing are trademarks by Ciba Ltd.); chrome dyes such as Sunchromine Yellow GG (C.I. Mordant Yellow 1), Sunchromine Red B (C.I. Mordant Red 15), Sunchromine Fast Blue MB (C.I. Mordant Blue 13), Sunchromine Black A (C.I. Mordant Black 1), Sunchromine Blue Black B (C.I. Mordant Black 3) (the foregoing are trademarks by Sumitomo Chemical Co.).

The synthetic resins upon which the present dyestuff acceptor for synthetic resins can exert dyeing effect are polyamides, polyesters, polyolefins, halogen-containing resins, acrylic resins, acrylonitrile resins, and styrene resins. Polyvinyl chloride and its copolymers are the synthetic resins especially susceptible to remarkable effect of the present dyestuff acceptor. In order to effect the dyeing of polyvinyl chloride or its copolymers by use of the present dyestuff acceptor, it is preferable to achieve the object either by immersing powdered polyvinyl chloride into an organic solution containing the dyestuff acceptor so that the resin powder may be perfectly and uniformly coated with the dyestuff acceptor, or by coating shaped polyvinyl chloride articles with the organic solution containing the present dyestuff acceptor, and then, after removal of the solvent, contacting the thus treated resin powder or shaped articles with a dyestuff solution (it is of course unnecessary to contact again with the dyestuff solution in case the dyestuff has already been added to the organic solution containing the present dyestuff acceptor).

When polyvinyl chloride or its copolymers are to be dyed, it is desirable in view of improving the dyeing performance and adhesion to film that the organic solution of the dyestuff acceptor be admixed, as dissolved, with 100 parts by weight or less of the polyvinyl chloride or its copolymer for 1 part by weight of the dyestuff acceptor and 1 part by weight or less of a plasticizer for 1 part by weight of the polyvinyl chloride or its copolymer.

The plasticizers to be used are those which have been generally known, including phthalate esters such as dibutyl phthalate, di-2-ethylhexyl phthalate, di-n-octyl phthalate, butyl lauryl phthalate, dilauryl phthalate, butyl benzyl phthalate, and the like; esters of dibasic acids such as dioctyl adipate, dioctyl azelate, dioctyl sebacate, and di-2-ethylhexyl succinate; citrate esters such as acetyl triethyl citrate, acetyl tributyl citrate, acetyl tri-2-ethylhexyl citrate, triethyl citrate, tributyl citrate, and tri-2-ethylhexyl citrate; and phosphate esters such as tricresyl phosphate, trixylenyl phosphate, monooctyl diphenyl phosphate, monobutyl dixylenyl phosphate, and trioctyl phosphate.

It is also possible to add, if necessary, stabilizers, fillers, pigments, antistatic agents, etc., to the organic solution containing the present dyestuff acceptor, as far as the dyeing performance is not adversely affected.

The dyestuff acceptor for synthetic resins according to this invention is a novel dyestuff acceptor. By use of this dyestuff acceptor it becomes possible to dye effectively even polyvinyl chloride which has, heretofore, been considered difficult to dye. The present dyestuff acceptor exhibits distinguished dyeing performance particularly in superior brightness and deepness of color, as compared with the case where an aminoalkyl acrylate compound is used alone.

Further, the present dyestuff acceptor can be used as a solution in organic solvents, permitting bright and deep dyeing when the solution is used as a top-coating agent which has an advantage of exerting entirely no harmful effect on physical and mechanical properties of the substrate material.

The invention is illustrated below in further detail with reference to Examples, but the invention is not limited thereto. In Examples, all parts and percentages are by weight.

The dyeing test was preformed in the following way:
Relative reflectance of the dyed article:
Reflectance of the surface of dyed article was expressed by assuming that of the surface of undyed article as 100.
Fastness:
Fastness was tested against hot water (60° C) by the beaker method in conformity to JIS L 1046.

EXAMPLE 1

A dyestuff acceptor solution in organic solvent was prepared by dissolving 7 parts of a methyl methacrylate-N,N-dimethylaminoethyl methacrylate copolymer containing 29% by weight of N,N-dimethylaminoethyl methacrylate unit (intrinsic viscosity of the copolymer being C.35 dl/g, as measured in acetone at 25° C.), 100 parts of a vinyl chloride-vinyl acetate copolymer (having a vinyl acetate content of 9.2% and a polymerization degree of 700), 50 parts of dioctyl phthalate, and 2 parts of an organometal compound shown in Table 1, in 1,000 parts of tetrahydrofuran. This organic solution of the dyestuff acceptor was uniformly coated on a foamed polyvinyl chloride leather, which had been prepared by applying polyvinyl chloride parts on a cotton cloth and then allowing to foam, by means of a brush at a rate of about 1.5 ml/dm², then air-dried and heated at 100° C for 5 minutes. The treated leather was immersed into a dye bath comprising 1 part (1% O.W.S.) of Lanyl Brown 3R, 1 part of acetic acid, and 500 parts of water, at 60° C. for 30 minutes. The dyed article thus obtained was in uniform brown color. In order to examine the dyeing performance, the reflectance and the fastness were determined.

For comparison, the above-noted foamed leather was treated in the same manner as mentioned above, except that either or both of the methyl methacrylate-N,N-dimethylaminoethyl methacrylate copolymer and the polyvalent metal compound were not used in the dyestuff acceptor. The dyed article was also tested for the dyeing performance. The results obtained were as shown in Table 1.

Table 1

| Run No. | Polyvalent metal compound | Relative reflectance of dyed article | Fastness (rating) |
|---|---|---|---|
| 1 | Iron naphthenate | 21.6 | 5 |
| 2 | Cobalt acetate | 25.3 | " |
| 3 | Nickel laurate | 21.2 | " |
| 4 | Dibutyltin maleate polymer | 7.3 | " |
| 5 | Tetraoctyltin | 13.5 | " |
| 6 | Polydimethylsiloxane | 15.2 | " |
| 7 | Ferrocene | 19.7 | " |
| 8 | Dioctyltin distearate | 6.5 | " |
| Comparative Example | | | |
| 1 | No dyestuff acceptor | 60.2 | 3 |
| 2 | Copolymer alone | 38.8 | 5 |
| 3 | Dibutyltin maleate polymer alone | 50.4 | 3 |
| 4 | Aluminum isopropoxide | 58.0 | 3 |

From Table 1, it is evident that excellent dyeing of polyvinyl chloride can be effected by use of the present dyestuff acceptor.

EXAMPLE 2

Dyeing was carried out in the same manner as in Example 1, run No. 4, except that Suminol Levelling Sky Blue R was used in place of the Lanyl Brown 3R. The resulting dyed article showed a relative reflectance of 7.5 and a fastness scale of 5.

EXAMPLE 3

A dyestuff acceptor solution in organic solvent was prepared by dissolving 70 parts of the same methyl methacrylate-N,N-dimethylaminoethyl methacrylate copolymer as used in Example 1, 20 parts of an organomethallic compound shown in Table 2, and 40 parts of dioctyl phthalate, in 500 parts of toluene and 500 parts of methyl ethyl ketone. The resulting organic solution of the dyestuff acceptor was uniformly coated on a foamed polyvinyl chloride leather, which had been prepared by applying polyvinyl chloride paste on a cotton cloth and then allowing to foam, by means of a brush at a rate of about 0.2 ml/dm², then air-dried, and heated at 100° C. for 5 minutes. The treated leather was immersed into a dye bath comprising 1 part (1% O.W.S.) of Suminaol Fast Red BB, 1 part of acetic acid, and 500 parts of water, at 60° C. for 30 minutes. The dyed article thus obtained was in uniform red color. In order to examine the dyeing performance, the reflectance and the fastness were determined.

The results obtained were as shown in Table 2.

Table 2

| Run No. | Polyvalent metal compound | Relative reflectance of dyed article | Fastness (rating) |
|---|---|---|---|
| 1 | Dioctyltin dimercaptoacetate | 8.4 | 5 |
| 2 | Dioctyltin sulfide | 12.1 | " |
| 3 | Nickel oleate | 23.5 | " |
| 4 | Diphenyldichlorosilane | 16.4 | " |
| Comparative Example | | | |
| 1 | No dyestuff acceptor | 61.5 | 3 |
| 2 | Copolymer alone | 40.2 | 5 |

From Table 2, it is clear that excellent dyeing of polyvinyl chloride can be effected by use of the present dyestuff acceptor.

EXAMPLE 4

Dyeing was carried out in the same manner as in Example 3, run No. 1, except that Tetron fibers were used in place of the polyvinyl chloride leather. The resulting dyed article showed a relative reflectance of 5.2 and a fastness rating of 5.

EXAMPLE 5

Ten parts of a methyl acrylate-N,N-diethylaminoethyl methacrylate copolymer containing 32 % by weight of N,N-diethylaminoethyl methacrylate unit (intrinsic viscosity 0.65 dl/g, as measured in acetone at 25° C), 100 parts of polyvinyl chloride (polymerization degree 1,100), 50 parts of dioctyl phthalate, 0.4 part of stearic acid, 1 part of cadmium stearate, 1 part of barium stearate, and 2 parts of dibutyltin maleate were milled on a roll mill at 160° C. for 5 minutes to prepare a sheet, 0.5 mm in thickness. The sheet was laminated to a polyvinyl chloride plate by heating at 160° C. The laminated sheet was immersed for 30 minutes in the same dye bath as used in Example 1. The resulting dyed article was in uniform brown color and had a relative reflectance of 6.5 and a fastness rating of 5.

EXAMPLE 6

Dyeing was carried out in the same manner as in Example 5, except that polymethylphenylsiloxane was used in place of the dibutyltin maleate. The resulting dyed article had a relative reflectance of 14.3 and a fastness rating of 5.

EXAMPLE 7

The sheet, 0.5 mm in thickness, obtained in Example 5 was dyed, without having been laminated to a polyvinyl chloride plate, to obtain an excellently dyed article.

EXAMPLE 8

Seventy-eight parts of a methyl methacrylate-N,N-dimethylaminoethyl methacrylate copolymer containing 29 % by weight of N,N-dimethyl-aminoethyl methacrylate unit (intrinsic viscosity 0.35 dl/g, as measured in acetone at 25° C.) were thoroughly impregnated with 22 parts of dibutyltin maleate polymer. One hundred parts of the resulting powder mixture was immersed in a dye bath comprising 1 part of Lanyl Brown 3R, 1 part of acetic acid, and 500 parts of water, at 60° C. for 30 minutes with thorough stirring, then filtered, and dried. The resulting dyed powder was in uniform brown color.

An organic solution of the dyed dyestuff acceptor was prepared by dissolving 7 parts of the dyed powder obtained above, 100 parts of a vinyl chloride-vinyl acetate copolymer (vinyl acetate content, 9.2 %; polymerization degree, 700) and 50 parts of dioctyl phthalate, in 1,000 parts of tetrahydrofuran. The resulting organic solution of the dyestuff acceptor was uniformly coated on a foamed polyvinyl chloride leather, which had been prepared by applying polyvinyl chloride paste on a cotton cloth and then allowing to foam, by means of a brush at a rate of about 1.5 ml/dm², then air-dried, and heated at 100° C. for 5 minutes.

The resulting dyed article was in uniform brown color and had a relative reflectance of 7.0 and a fastness rating of 5.

EXAMPLE 9

Ten parts of the dyed powder obtained in Example 8, 100 parts of polyvinyl chloride (polymerization degree, 1100), 50 parts of dioctyl phthalate, 0.4 part of stearic acid, 1 part of cadmium stearate, and 1 part of barium stearate were milled on a roll mill at 150° C. for 5 minutes to prepare a sheet, 0.5 mm in thickness. The sheet thus prepared was laminated to a polyvinyl chloride plate by heating at 160° C.

The dyed article obtained was in uniform brown color and had a relative reflectance of 7.2 and a fastness rating of 5.

EXAMPLE 10

A dyestuff acceptor solution in organic solvent was prepared by dissolving 7 parts of a methyl methacrylate-N,N-dimethylaminoethyl methacrylate copolymer containing 29 % by weight of N,N-dimethylaminoethyl methacrylate unit (intrinsic viscosity 0.35 dl/g, as measured in acetone at 25° C.), 100 parts of a vinyl chloride-vinyl acetate copolymer (vinyl acetate content, 9.2 %; polymerization degree, 700), 50 parts of dioctyl phthalate, 2 parts of dibutyltin maleate, and 0.2 part of Suminol Levelling Sky Blue R, in 1,000 parts of tetrahydrofuran.

The resulting organic solution of the dyestuff acceptor was uniformly coated on a foamed polyvinyl chloride leather, which had been prepared by applying polyvinyl chloride paste on a cotton cloth and then allowing to foam, by means of a brush at a rate of about 1.5 ml/dm², then air-dried, and heated at 100° C. for 5 minutes.

The dyed article thus obtained was in uniform blue color and had a relative reflectance of 8.9 and a fastness rating of 5.

EXAMPLE 11

The dyed article obtained in Example 10 was further immersed into an aqueous acidic solution comprising 0.2 part of Suminol Levelling Sky Blue R, 1 part of acetic acid, and 500 parts of water, at 60° C. for 30 minutes.

The dyed article thus treated was in uniform blue color and had a relative reflectance of 8.0 and a fastness rating of 5.

What is claimed is:

1. A dyestuff acceptor of synthetic resins, comprising as essential components (A) a copolymer comprising about 20 to 99 mole % of at least one ethylenically unsaturated monomer which is not an aminoalkyl acrylate compound and about 1 to 80 mole % of an aminoalkyl acrylate compound represented by the formula,

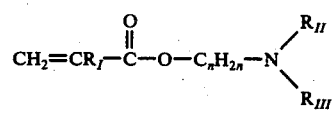

wherein $R_I$ is hydrogen or methyl, $R_{II}$ and $R_{III}$ each are hydrogen or alkyl having 1 to 4 carbon atoms, and $n$ is an integer from 1 to 4, and (B) a compound of a polyvalent element selected from silicon and tin, having at least one functional group selected from the group consisting of carboxyl, thioalkoxy, alkyl, phenyl and cyclopentadienyl, the weight ratio of said component (A) to said component (B) being about 100:1 to 1:1.

2. The dyestuff acceptor for synthetic resins according to claim 1, wherein the ethylenically unsaturated monomer is selected from the group consisting of a vinyl ester having 2 to 6 carbon atoms in saturated carboxylic acid moiety, acrylate and methacrylate both having 1 to 18 carbon atoms in alcohol moiety.

3. The dyestuff acceptor for synthetic resins according to claim 1, wherein the copolymer is selected from the group consisting of methylmethacrylate-N,N-dimethylaminoethyl methacrylate copolymer and methylacrylate-N,N-diethylaminoethyl methacrylate copolymer.

4. The dyestuff acceptor for synthetic resins according to claim 1, wherein the copolymer has an intrinsic viscosity of 0.1 to 3 dl/g as measured in acetone at 25° C.

5. The dyestuff acceptor for synthetic resins according to claim 1, wherein the compound of a polyvalent element is a compound having the formula, $$MX_m$$

wherein M is silicon or tin, X can be either the same or different and is selected from the group consisting of carboxyl, thioalkoxy, alkyl, phenyl, and cyclopentadienyl, and m is the atomic valence of the element M.

6. The dyestuff acceptor for synthetic resins according to claim 5, wherein the compound of a polyvalent element is dioctyltin sulfide, dimethylpolysiloxane or methylphenylpolysiloxane.

7. The dyestuff acceptor for synthetic resins according to claim 1, wherein the compound of a polyvalent element is diphenyldichlorosilane, dibutyltin dichloride, dioctyltin dichloride, tributyltin chloride, trioctyltin chloride, butyltin trichloride, octyltin trichloride, phenyltrichlorosilane, trimethylchlorosilane, or dimethyldichlorosilane.

8. The dyestuff acceptor for synthetic resins according to claim 1, wherein the polyvalent element is tin.

9. The dyestuff acceptor for synthetic resins according to claim 1, wherein the weight ratio of the component (A) to the component (B) is about 50 : 1 to 2 : 1.

10. A dyeable composition comprising a synthetic resin powder selected from the group consisting of polyamides, polyesters, polyolefins, polyvinyl halides, polyacrylates, polyacrylonitriles and polystyrene, and the dyestuff acceptor for synthetic resins according to claim 1.

11. The dyeable composition according to claim 10, wherein the synthetic resin is polyvinyl chloride.

12. The dyeable composition according to claim 10, wherein the ratio of the dyestuff acceptor to the resin power is 0.1–50 : 100.

13. A composition for dyeing synthetic resin comprising a solvent selected from the group consisting of aromatic hydrocarbons, ketones, ethers, aromatic nitro compounds and mixture thereof and the dyestuff acceptor according to claim 1.

14. The dyestuff acceptor for synthetic resins according to claim 5, wherein the compound of a polyvalent element is dibutyltin maleate and its polymer, tetraoctyltin, dioctyltin distearate, or dioctyltin dimercaptoacetate.

15. The dyestuff acceptor for synthetic resins according to claim 5, wherein the compound of a polyvalent element is dibutyltin maleate polymer.

16. The dyestuff acceptor for synthetic resins according to claim 1, wherein the compound of a polyvalent element is a compound having the formula, $$MX_pY_q$$

wherein M is silicon or tin, X can be either the same or different and is selected from the group consisting of carboxyl, thioalkoxy, alkyl, phenyl and cyclopentadienyl, Y is oxygen or sulfur, and $p + 2q$ is the atomic valence of the element M.

17. The dyestuff acceptor for synthetic resins according to claim 1, wherein the compound of a polyvalent element is a compound having the formula $$MX_rZ_s$$

wherein M is silicon or tin, X can be either the same or different and is selected from the group consisting of carboxyl, thioalkoxy, alkyl, phenyl and cyclopentadienyl, Z is a halogen and $r + s$ is the atomic valence of the element M.

* * * * *